(12) United States Patent
Honda (10) Patent No.: US 10,891,088 B2
(45) Date of Patent: Jan. 12, 2021

(54) INFORMATION PROCESSING SYSTEM, INFORMATION PROCESSING APPARATUS, AND NON-TRANSITORY COMPUTER READABLE MEDIUM FOR TRANSMITTING A REQUEST INITIATED IN A FIRST NETWORK TO A SECOND NETWORK

(71) Applicant: FUJI XEROX CO., LTD., Tokyo (JP)

(72) Inventor: Takuya Honda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/550,658

(22) Filed: Aug. 26, 2019

(65) Prior Publication Data

US 2020/0301634 A1    Sep. 24, 2020

(30) Foreign Application Priority Data

Mar. 22, 2019    (JP) .................................. 2019-055310

(51) Int. Cl.
*G06F 3/12*    (2006.01)

(52) U.S. Cl.
CPC .......... *G06F 3/1236* (2013.01); *G06F 3/1238* (2013.01); *G06F 3/1253* (2013.01); *G06F 3/1292* (2013.01)

(58) Field of Classification Search
CPC .... G06F 3/1236; G06F 3/1253; G06F 3/1238; G06F 3/1292; H04N 1/32406
See application file for complete search history.

(56) References Cited

U.S. PATENT DOCUMENTS

2015/0212763 A1\* 7/2015 Sharpe .................... G06F 3/126
358/1.15
2015/0277820 A1\* 10/2015 Anezaki ................ G06F 3/1236
358/1.15

FOREIGN PATENT DOCUMENTS

JP    2006-212898 A    8/2006
JP    4411957 B2    2/2010

\* cited by examiner

*Primary Examiner* — Kent Yip
(74) *Attorney, Agent, or Firm* — Oliff PLC (57) ABSTRACT

An information processing system includes: a first information processing apparatus connected to first network; a second information processing apparatus connected to second network different from the first network; a user terminal connectable to the first network; and a storage apparatus communicable with the first information processing apparatus and the second information processing apparatus, wherein the first information processing apparatus receives a processing request from the user terminal via the first network, and then transmits the processing request to the storage apparatus when connection of the user terminal to the first network is terminated.

11 Claims, 9 Drawing Sheets

| JOB ID | TERMINAL ID | TRANSFERABILITY |
|---|---|---|
| J0001 | D0001 | PERMITTED |
| J0002 | D0405 | PERMITTED |
| J0003 | D0001 | NOT PERMITTED |
| J0004 | D0349 | PERMITTED |

INFORMATION PROCESSING SYSTEM, INFORMATION PROCESSING APPARATUS, AND NON-TRANSITORY COMPUTER READABLE MEDIUM FOR TRANSMITTING A REQUEST INITIATED IN A FIRST NETWORK TO A SECOND NETWORK

CROSS-REFERENCE TO RELATED APPLICATIONS

This application is based on and claims priority under 35 USC 119 from Japanese Patent Application No. 2019-055310 filed Mar. 22, 2019.

BACKGROUND

(i) Technical Field

The present disclosure relates to an information processing system, an information processing apparatus, and a non-transitory computer readable medium.

(ii) Related Art

In the related art, an image forming apparatus connectable to network has been known. Such an image forming apparatus has a function using network.

For example, JP-B-4411957 discloses an image forming apparatus that confirms necessity for printing on a transmission source terminal when it is determined that the transmission source terminal of a processing request is far from the image forming apparatus based on an IP address acquired from the processing request and an IP address of the image forming apparatus.

In addition, JP-A-2006-212898 discloses an image forming apparatus that receives a processing request including an IP address of the image forming apparatus, and transfers the processing request to the other image forming apparatus when the IP address is not the IP address of the own apparatus.

A system including a first information processing apparatus connected to the first network, a second information processing apparatus connected to the second network which is different from the first network, and a user terminal which is connected to the first network and the second network can be considered. Here, the fact that the first network and the second network are different from each other means a state where an apparatus connected to the first network cannot access an apparatus connected to the second network due to the networks are separated from each other by a firewall or the like.

In such a system, there may be a case where when the user terminal connected to the first network transmits the processing request to the first information processing apparatus, and then the user terminal (and the user) is moved, the user wants to process the processing request transmitted just before moving by using the second information processing apparatus. In such a case, since the processing request cannot be transferred to the second information processing apparatus from the first information processing apparatus, the user has to re-transmit the processing request to the second information processing apparatus.

SUMMARY

Aspects of non-limiting embodiments of the present disclosure relates to providing a system in which after a processing request is transmitted from a user terminal to a first information processing apparatus within first network, the processing request can be executed by a second information processing apparatus within second network different from the first network with no need for the user to re-transmit the processing request.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system including: a first information processing apparatus connected to first network; a second information processing apparatus connected to second network different from the first network; a user terminal connectable to the first network; and a storage apparatus communicable with the first information processing apparatus and the second information processing apparatus, wherein the first information processing apparatus receives a processing request from the user terminal via the first network, and then transmits the processing request to the storage apparatus when connection of the user terminal to the first network is terminated.

BRIEF DESCRIPTION OF THE DRAWINGS

Exemplary embodiments of the present invention will be described in detail based on the following figures, wherein.

DETAILED DESCRIPTION

Figure 1:
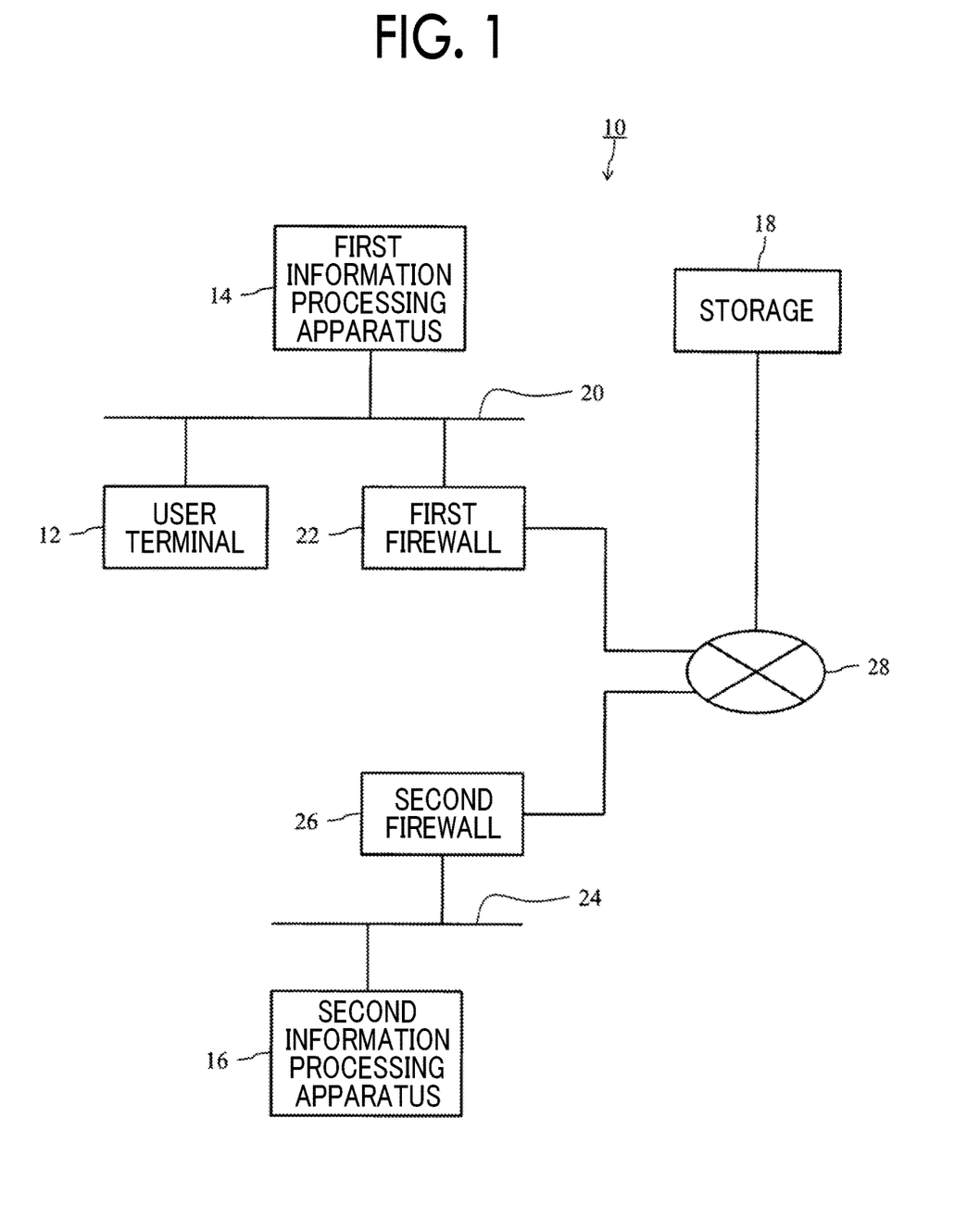
FIG. 1 is a configuration diagram illustrating an information processing system according to the exemplary embodiment.

FIG. 1 is a configuration diagram illustrating an information processing system 10 according to the exemplary embodiment. The information processing system 10 includes a user terminal 12 used by a user, a first information processing apparatus 14, a second information processing apparatus 16, and a storage 18 as a storage apparatus. Although FIG. 1 illustrates only one user terminal 12, the information processing system 10 may include plural user terminals 12 used by plural users.

The first information processing apparatus 14 is connected to first network 20 including, for example, a LAN, receives a processing request (that is, a job) from another apparatus connected to the first network 20 so as to execute the job.

The first network 20 is provided with a first firewall 22. The first firewall 22 monitors access from the outside of the first network 20 and blocks unauthorized access. The first firewall 22 permits the access of the user terminal 12 to the first network 20, that is, the user terminal 12 is connectable to the first network 20.

In the exemplary embodiment, the first information processing apparatus 14 is installed in a shared office, and the first network 20 is network installed in the shared office. The first network 20 can be connected to plural user terminals 12 used by the users in various types of industries using the shared office, and each user can share and use the first information processing apparatus 14. Of course, the location where the first information processing apparatus 14 is installed is not limited to the shared office, and may be, for example, a company at which the user works.

The second information processing apparatus 16 is connected to second network 24 different from the first network 20. The second network 24 also includes, for example, LAN. As described above, the feature that the first network 20 and the second network 24 are different from each other means that an apparatus connected to the first network 20 cannot access another apparatus connected to the second network 24. The second information processing apparatus 16 can also receive a job from another apparatus connected to the second network 24 and execute the job.

The second network 24 is provided with a second firewall 26. The second firewall 26 monitors access from the outside of the second network 24 and blocks unauthorized access. By the first firewall 22 provided in the first network 20 and the second firewall 26 provided in the second network 24, the access from the device connected to the first network 20 to the device connected to the second network 24 is blocked. In the exemplary embodiment, the second firewall 26 does not permit the access of the user terminal 12 to the second network 24, that is, the user terminal 12 is not connectable to the second network 24. The second firewall 26 may permit the connection of the user terminal 12 to the second network 24 so that the user terminal 12 can be connected to the second network 24.

In the exemplary embodiment, the second information processing apparatus 16 is installed on outside of the shared office. For example, it is a convenience store. In this case, the second network 24 is network laid in the convenience store.

The storage 18 includes, for example, a server computer. The storage 18 includes a communication unit that includes a communication module, a storage unit that includes a memory such as a hard disk, and a control unit that includes CPU. The first firewall 22 permits communication between the storage 18 and the first information processing apparatus 14, and the second firewall 26 permits communication between the storage 18 and the second information processing apparatus 16. That is, the storage 18 is communicably connected to the first information processing apparatus 14 and the second information processing apparatus 16 via a communication line 28 including the Internet or LAN.

Figure 2:
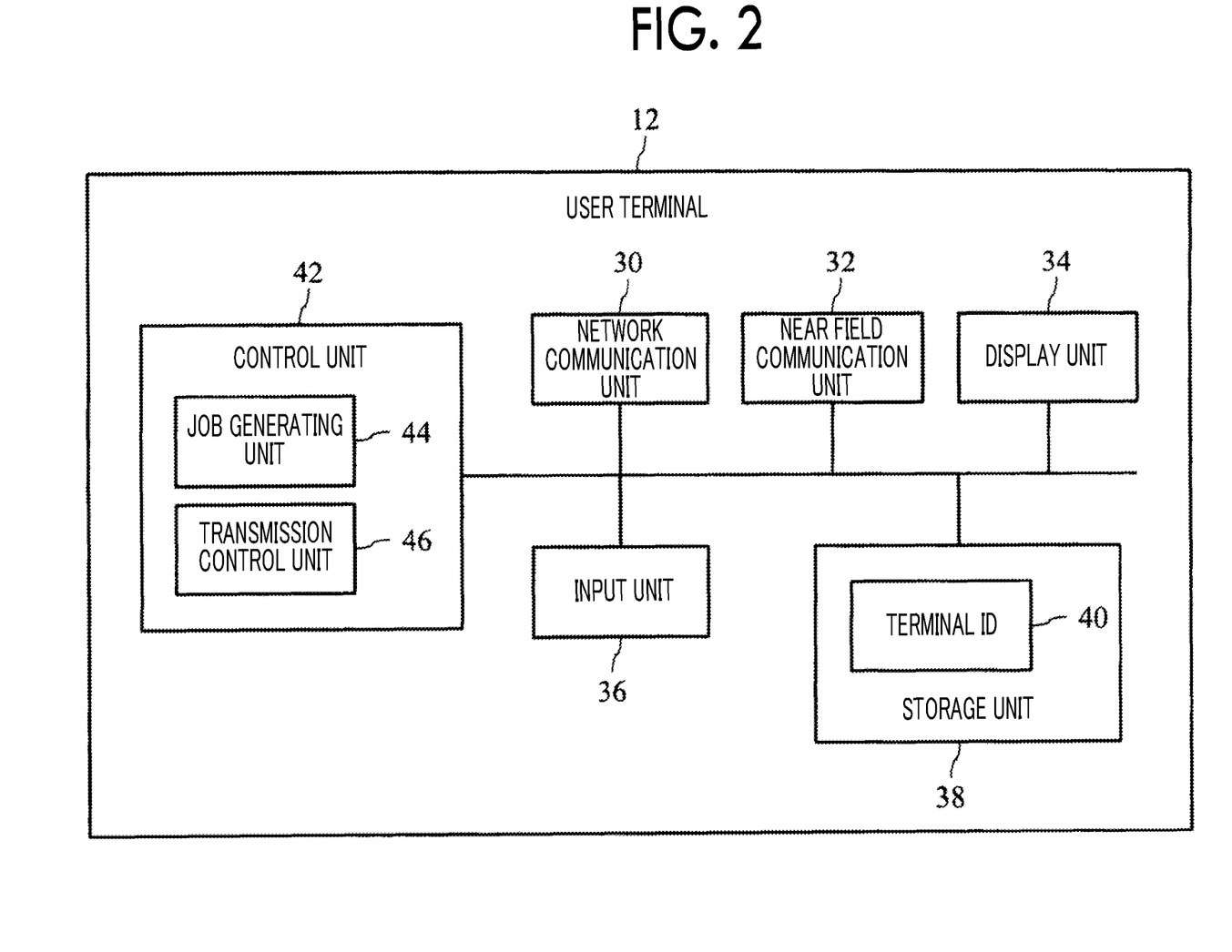
FIG. 2 is a configuration diagram illustrating a user terminal according to the exemplary embodiment.

FIG. 2 is a configuration diagram illustrating the user terminal 12. The user terminal 12 is a portable terminal, such as a laptop PC, a tablet terminal, or a smartphone. Of course, the user terminal 12 is not limited to such a device, and may be any device as long as it exhibits the functions described below.

A network communication unit 30 includes, for example, a LAN card. The network communication unit 30 communicates with the first information processing apparatus 14 via the first network 20. The network communication unit 30 transmits a job to the first information processing apparatus 14.

The near field communication unit 32 includes, for example, a Bluetooth (registered trademark) module. The near field communication unit 32 performs pairing with another apparatus in the vicinity of the user terminal 12, and similarly including a near field communication unit, and then directly performs wireless communication with the apparatus. In addition, the near field communication unit 32 wirelessly transmits predetermined information in the vicinity of the user terminal 12.

A display unit 34 is configured of, for example, a liquid crystal display or an organic EL display. The display unit 34 displays various information for the user.

An input unit 36 includes, for example, a touch panel, a button, or a keyboard. The input unit 36 is used to input a user's instruction to the user terminal 12.

A storage unit 38 includes, for example, a ROM, a RAM, or a hard disk. The storage unit 38 stores a program for operating each unit of the user terminal 12. Further, the storage unit 38 stores a terminal ID 40 as a terminal identifier. The terminal ID 40 uniquely identifies the user terminal 12. The terminal ID 40 is generated, for example, by combining a MAC address of the user terminal 12 and login information when the user logs in to the user terminal 12.

The control unit 42 includes, for example, a CPU or a microcontroller. The control unit 42 controls each unit of the user terminal 12 in accordance with the program stored in the storage unit 38. Further, as illustrated in FIG. 2, the control unit 42 also functions as a job generating unit 44 and a transmission control unit 46.

The job generating unit 44 generates a job for causing the first information processing apparatus 14 or the second information processing apparatus 16 to execute processing. In the exemplary embodiment, the job generating unit 44 generates a print job for causing the first information processing apparatus 14 or the second information processing apparatus 16 to execute printing. For example, when the control unit 42 executes a document creation application and the user inputs a print instruction of the created document by the input unit 36, the job generating unit 44 generates a print job for printing the document. Note that, the job generated by the job generating unit 44 may be any other jobs as long as it causes some processing to execute by the first information processing apparatus 14 or the second information processing apparatus 16.

The job generating unit 44 transmits the generated job and the terminal ID 40 in association with each other to the first information processing apparatus 14 from the network communication unit 30 via the first network 20. In the exemplary embodiment, the job generating unit 44 includes the terminal ID 40 in the job and transmits the job to the first information processing apparatus 14. The job and the terminal ID 40 may be associated and then transmitted separately without including the terminal ID 40 in the job.

Preferably, the job generating unit 44 transmits transferability information, which is set by the user, indicating job transferability in association with the job to the first information processing apparatus 14. Although described later in detail, when a predetermined condition is satisfied, the job transmitted from the user terminal 12 to the first information processing apparatus 14 is transmitted from the first information processing apparatus 14 to the storage 18. The transferability information is information indicating whether or not the job is permitted to be transmitted from the first information processing apparatus 14 to the storage 18. In the exemplary embodiment, the transferability information is also included in the job, but the job generating unit 44 may separately transmit the job after associating the transferability information with the job.

The transmission control unit 46 controls the transmission of information from the near field communication unit 32. Specifically, the transmission control unit 46 transmits the job to the first information processing apparatus 14, and causes the near field communication unit 32 to start the transmission of the terminal ID 40 when the network communication unit 30 receives receipt confirmation information indicating that the job is received from the first information processing apparatus 14. This is to notify the first information processing apparatus 14 or the second information processing apparatus 16 of the proximity of the user terminal 12. Further, as described later, when the predetermined condition is satisfied, the transmission control unit 46 causes the near field communication unit 32 to start transmission of execution instruction information indicating a job execution instruction in place of the terminal ID 40.

Figure 3:
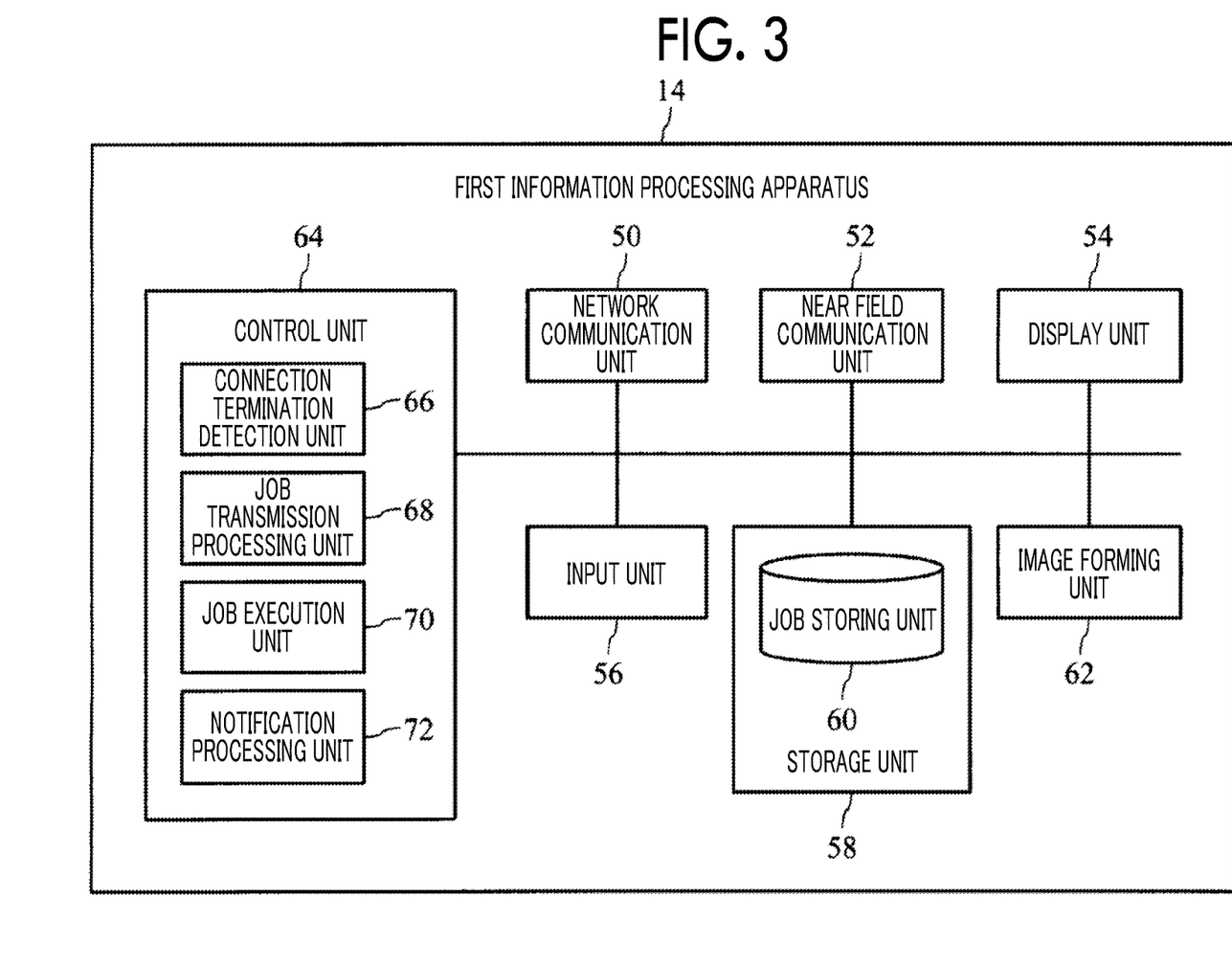
FIG. 3 is a configuration diagram illustrating a first information processing apparatus according to the exemplary embodiment.

FIG. 3 is a configuration diagram illustrating the first information processing apparatus 14. The first information processing apparatus 14 according to the exemplary embodiment is an image forming apparatus capable of executing the printing, but other apparatuses may be employed as the first information processing apparatus 14, as long as it can execute the job transmitted from the user terminal 12.

A network communication unit 50 includes, for example, a LAN card. The network communication unit 50 communicates with the user terminal 12 and the storage 18 via the first network 20. The network communication unit 50 receives a job from the user terminal 12. Once the network communication unit 50 receives the job from the user terminal 12, it transmits the receipt confirmation information to the user terminal 12. Further, the network communication unit 50 transmits the job received from the user terminal 12 to the storage 18 in the case where the predetermined condition is satisfied.

A near field communication unit 52 includes, for example, a Bluetooth module. The near field communication unit 52 is used to perform pairing with another apparatus in the vicinity of the first information processing apparatus 14, and similarly including a near field communication unit, and then to directly perform wireless communication with the apparatus. In particular, the near field communication unit 52 performs the near field communication with the user terminal 12. In addition, the near field communication unit 52 receives the information transmitted from the near field communication unit 32 of the user terminal 12.

A display unit 54 is configured of, for example, a liquid crystal display or an organic EL display. The display unit 54 displays various information relating to the first information processing apparatus 14.

An input unit 56 includes, for example, a touch panel or a button. The input unit 56 is used to input a user's instruction to the first information processing apparatus 14.

A storage unit 58 includes, for example, a ROM, a RAM, or a hard disk. The storage unit 58 stores information processing program for operating each unit of the first information processing apparatus 14. The storage unit 58 also includes a job storing unit 60 that stores the received job and job information related to the job.

Figure 4:
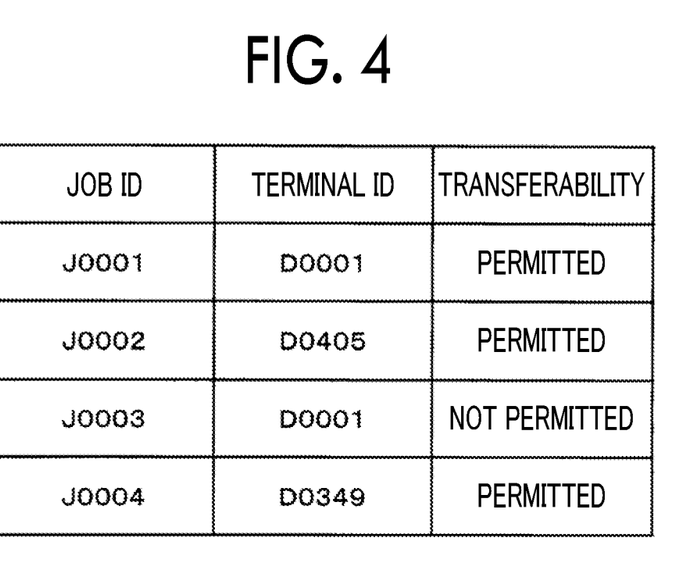
FIG. 4 is a conceptual view indicating an example of job information.

FIG. 4 illustrates an example of the contents of the job information. The job information stores a job ID uniquely identifying a job stored in the job storing unit 60, a terminal ID 40 of the user terminal 12 that has transmitted the job, and transferability of the job in association with each other. The job ID is assigned to the job by a control unit 64 described later when the job is received from the user terminal 12. The terminal ID 40 and the transferability are transmitted from the user terminal 12 in association with the job.

Every time the job is received, the job storing unit 60 stores the job and the job information, and when the job is executed or the job is transmitted to the storage 18, the job and the job information corresponding to the job are deleted from the job storing unit 60.

An image forming unit 62 includes a photosensitive drum, toner, or a recording medium transport device. The image forming unit 62 executes printing for forming an image on a recording medium according to the job stored in the job storing unit 60.

The control unit 64 includes, for example, a CPU or a microcontroller. The control unit 64 controls each unit of the first information processing apparatus 14 in accordance with the information processing program stored in the storage unit 58. In addition, as illustrated in FIG. 3, the control unit 64 has functions as a connection termination detection unit 66, a job transmission processing unit 68, a job execution unit 70, and a notification processing unit 72.

The connection termination detection unit 66 determines whether or not the connection of the user terminal 12 to the first network 20 is terminated after the job is received from the user terminal 12. Whether or not the connection of the user terminal 12 to the first network 20 is terminated can be detected in various ways.

For example, the connection termination detection unit 66 intermittently transmits connection confirmation information via the first network 20 to the user terminal 12 that has transmitted the job, using the reception of the job as a trigger. For example, the connection termination detection unit 66 periodically transmits Ping to the user terminal 12. The destination of the connection confirmation information can be specified based on information (for example, transmission source IP address) indicating the transmission source of the job received from the user terminal 12 together with the job. In addition, when the connection termination detection unit 66 cannot communicate with the user terminal 12 via the first network 20 for a predetermined time, it is determined that the connection of the user terminal 12 to the first network 20 is terminated. For example, when the response to the transmitted Ping does not return from the user terminal 12 for a predetermined time, it is determined that the connection of the user terminal 12 to the first network 20 is terminated.

As described above, when the receipt confirmation information is received from the first information processing apparatus 14, the user terminal 12 starts transmitting the terminal ID 40, and thus the connection termination detection unit 66 may determine that the connection of the user terminal 12 to the first network 20 is terminated when radio wave strength of radio wave indicating the terminal ID 40 received by the near field communication unit 52 from the user terminal 12 that has transmitted the job is a predetermined strength or lower.

In addition, after the terminal ID 40 and the user ID identifying the user using the user terminal 12 indicated by the terminal ID 40 are associated with each other and stored in the storage unit 58, the connection termination detection unit 66 may determine whether or not the connection of the user terminal 12 to the first network 20 is terminated based on the information from an entry and exit management system that manages the entry and exit of the user to an area where the first network 20 is laid. For example, when the entry and exit management system detects that the user using the user terminal 12 having transmitted the job has left, the connection termination detection unit 66 receives notification from the entry and exit management system that the user has left, and in a case of receiving the notification, it may be determined that the connection of the user terminal 12 to the first network 20 is terminated.

Further, the connection termination detection unit 66 may determine whether or not the connection of the user terminal 12 to the first network 20 is terminated by a combination of plural determination methods described above.

When the connection termination detection unit 66 detects termination of the connection of the user terminal 12, having transmitted the job to the first information processing apparatus 14, to the first network 20, the job transmission processing unit 68 transmits, to the storage 18, the job and the terminal ID 40 of the user terminal 12 in association with each other. Then, the job transmission processing unit 68 deletes the transmitted job and the job information of the job from the job storing unit 60.

When the connection of the user terminal 12, having transmitted the job to the first information processing apparatus 14, to the first network 20 is terminated, there is a possibility that the user using the user terminal 12 has left the area (the shared office in the exemplary embodiment) in which the first network 20 is laid. In this case, the user may not execute the job already transmitted to the first information processing apparatus 14 by the first information processing apparatus 14. Furthermore, the user may want to execute the job with another information processing apparatus, for example, the second information processing apparatus 16 installed in a convenience store.

Accordingly, when the connection of the user terminal 12, having transmitted the job to the first information processing apparatus 14, to the first network 20 is terminated, the job transmission processing unit 68 transmits the job and the terminal ID 40 to the storage 18 communicable with the second information processing apparatus 16. The storage 18 stores the received job and the terminal ID in association with each other in the storage unit of the storage 18. As a result, when the user wants to execute the job in the second information processing apparatus 16, the storage 18 can transfer the job to the second information processing apparatus 16, so that the job can be executed in the second information processing apparatus 16.

In addition, if the information regarding the job stored in the job storing unit 60 can be displayed on the display unit 54, when the job that may not be processed by the first information processing apparatus 14 is left in the job storing unit 60, there is a possibility that information (for example, a file name and a transmission user name) related to the job may be viewed by other users except for the user who transmitted the job. In particular, when the first information processing apparatus 14 is installed in the shared office as the exemplary embodiment, there is a possibility that information on the job may be viewed by plural users in various types of industries. Therefore, when the job transmission processing unit 68 deletes the job transmitted to the storage 18 and the job information of the job from the job storing unit 60, it is possible to prevent other people from seeing information related to the job.

When the plural jobs transmitted from the plural user terminals 12 are stored in the job storing unit 60, the job transmission processing unit 68 transmits to the storage 18 the job associated with the terminal ID of the user terminal 12 whose connection to the first network 20 is terminated among the plural jobs stored in the job storing unit 60. For example, in a state where job information as illustrated in FIG. 4 is stored in the job storing unit 60, when the terminal ID of the user terminal 12 whose connection to the first network 20 is terminated is "D0001", two jobs indicated by job IDs "J0001" and "J0003" are transmitted to the storage 18, and jobs indicated by job IDs "J0002" and "J0004" are not transmitted to the storage 18.

Further, among the jobs associated with the terminal ID of the user terminal 12 whose connection to the first network 20 is terminated, only the jobs for which transfer is permitted in the transferability information may be transmitted to the storage 18. For example, in a state where the job information as illustrated in FIG. 4 is stored in the job storing unit 60, when the terminal ID of the user terminal 12 whose connection to the first network 20 is terminated is "D0001", the job indicated by the job ID "J0001" may be transmitted to the storage 18, and the job indicated by the job ID "J0003" may not be transmitted to the storage 18, in which the job ID "J0001" is associated with the terminal ID "D0001" for which the transferability information is "permitted", that is, the transfer is permitted, while the job ID "J0003" is associated with the terminal ID "D0001" for which, however, the transferability information is "not permitted", that is, the transfer is not permitted.

When the connection termination detection unit 66 detects that the connection of the user terminal 12, having transmitted the job to the first information processing apparatus 14, to the first network 20 is terminated, and the distance condition that the distance between the first information processing apparatus 14 and the user terminal 12 is equal to or more than a predetermined distance is satisfied, the job transmission processing unit 68 may transmit the job and the terminal ID of the user terminal 12 in association with each other to the storage 18.

The connection termination detection unit 66 not only detects that the connection to the first network 20 is terminated, but if the distance between the first information processing apparatus 14 and the user terminal 12 becomes equal to or more than a predetermined distance, the possibility that the user using the user terminal 12 is farther away from the area in which the first network 20 is laid is high. Therefore, when the job transmission processing unit 68 transmits the job and the terminal ID to the storage 18 when the connection termination detection unit 66 detects that the connection to the first network 20 is terminated, and the above distance condition is satisfied, if there is higher possibility that the user is away from the area where the first network 20 is laid by transmitting the job and terminal ID to the storage 18, that is, if there is high possibility that the first information processing apparatus 14 does not execute the job, the job and the terminal ID 40 can be transmitted to the storage 18.

The distance between the first information processing apparatus 14 and the user terminal 12 can be acquired, for example, as follows. The current position acquisition unit (for example, GPS) is provided in the user terminal 12, and the user terminal 12 periodically transmits the current position information indicating the current position of the user terminal 12 to the first information processing apparatus 14 from the network communication unit 30 or the near field communication unit 32. The first information processing apparatus 14 acquires the distance between the first information processing apparatus 14 and the user terminal 12 based on the received current position information and the known current position of the own apparatus.

When the connection termination detection unit 66 detects that the connection of the user terminal 12, having transmitted the job to the first information processing apparatus 14, to the first network 20 is terminated, and the time condition that the current time is during the business hours of the user using the user terminal 12 is satisfied, the job transmission processing unit 68 may transmit the job and the terminal ID of the user terminal 12 in association with each other to the storage 18.

When the connection of the user terminal 12 of the user to the first network 20 is terminated at a time out of the business hours of the user, it may simply mean that the user returns home. In this case, there is possibility that the user comes to the area where the first network 20 is laid again on the next day, and executes the job in the first information processing apparatus 14. On the other hand, at the time during the business hours of the user, when the connection of the user terminal 12 of the user to the first network 20 is terminated, the user is likely to continue work at another place, and if it is, there is a possibility that the user wants to execute the job in the second information processing apparatus 16 installed in another information processing apparatus. Therefore, when the job transmission processing unit 68 transmits the job and the terminal ID to the storage 18 when the connection termination detection unit 66 detects that the connection to the first network 20 is terminated, and the above time condition is satisfied, if there is high possibility that the first information processing apparatus 14 does not execute the job, the job and the terminal ID 40 can be transmitted to the storage 18.

When the connection termination detection unit 66 detects that the connection of the user terminal 12, having transmitted the job to the first information processing apparatus 14, to the first network 20 is terminated, and both of the distance condition and the time condition are satisfied, the job transmission processing unit 68 may transmit the job and the terminal ID of the user terminal 12 in association with each other to the storage 18.

When the user tries to execute the job on the first information processing apparatus 14 after the first information processing apparatus 14 transmits the job to the storage 18, the first information processing apparatus 14 does not store the job, and thus it is necessary to have the storage 18 return the job. In this case, extra communication between the first information processing apparatus 14 and the storage 18 which is originally unnecessary occurs. As described above, when the condition for the job transmission processing unit 68 to transmit the job to the storage 18 is strict so that there is a high possibility that the first information processing apparatus 14 does not execute the job, by transmitting the job and the terminal ID 40 to the storage 18, the occurrence of the above-described extra communication can be suppressed.

The job execution unit 70 causes the image forming unit 62 to execute printing based on the job received from the user terminal 12. Specifically, first, the job execution unit 70 receives a job from the user terminal 12, and checks whether or not the job corresponding to the received terminal ID 40 is stored in the job storing unit 60 when the connection termination detection unit 66 does not detect the termination of the connection of the user terminal 12 to the first network 20, and the near field communication unit 52 receives the terminal ID 40 transmitted by the user terminal 12.

When the job corresponding to the received terminal ID 40 is stored in the job storing unit 60, the job execution unit 70 transmits, from the near field communication unit 52 to the user terminal 12, a notification that the job corresponding to the received terminal ID 40 is stored. The notification includes the job ID of the job. When the job corresponding to the received terminal ID 40 is not stored, if the job has been transmitted to the storage 18 in the past, the job execution unit 70 transmits the request for returning the job to the storage 18 and has the job returned from the storage 18, and then transmits the above notification to the user terminal 12. If the job corresponding to the received terminal ID 40 has not been received from the user terminal 12, the job execution unit 70 does not execute any further processing.

Based on the notification, the display unit 34 of the user terminal 12 displays a screen for confirming whether or not the user is to transmit a job execution instruction to the first information processing apparatus 14. When the user instructs the transmission of the execution instruction on the screen, the near field communication unit 32 of the user terminal 12 transmits the execution instruction information indicating the execution instruction of the job instead of the terminal ID 40. The execution instruction information includes the job ID of the job that is a target for the execution instruction. When the near field communication unit 52 of the first information processing apparatus 14 receives the execution instruction information, the job execution unit 70 executes the job corresponding to the job ID included in the execution instruction information in the image forming unit 62.

The job execution unit 70 deletes the executed job and the job information of the job from the job storing unit 60 after the execution of the job is completed.

Note that, the user can directly operate the first information processing apparatus 14 so as to input a job execution instruction. Specifically, after the job execution unit 70 receives the job from the user terminal 12, when a screen for confirming whether or not to execute the job is displayed on the display unit 54 of the first information processing apparatus 14 and the user inputs the job execution instruction from the input unit 56, the image forming unit 62 may execute the job. Also, for the purpose of enhancing the security at job execution time, a password is set when transmitting the job from the user terminal 12 to the first information processing apparatus 14, and when the execution instruction is input from the input unit 56, the user is prompted for a password, and when the previously set password matches the entered password, the image forming unit 62 may execute the job. Also, in order to prevent other users from seeing information related to the job (for example, file name and sending user name), when the screen for confirming whether or not to execute the job is displayed on the display unit 54, information related to the job may not be displayed.

The notification processing unit 72 transmits execution completion notification indicating that the job execution unit 70 has completed the execution of the job, and the job and job information relating to the job have been deleted from the job storing unit 60 to the user terminal 12 from the near field communication unit 52.

In addition, the notification processing unit 72 transmits to the user terminal 12 a job transmission notification indicating that when the job is transmitted to the storage 18 by job transmission processing unit 68, the job is transmitted to the storage 18, and the job and the job information relating to the job are deleted from the job storing unit 60. In this case, the user terminal 12 is not connected to the first network 20, and since the possibility of being at a position away from the first information processing apparatus 14 is high, the notification processing unit 72 stores the job transmission notification, and transmits the job transmission notification from the network communication unit 50 to the user terminal 12 again when the user terminal 12 is connected to the first network 20. Alternatively, when the first information processing apparatus 14 and the user terminal 12 can communicate with each other by a separate communication unit such as an internet connection or a mobile telephone communication network, the job transmission notification may be transmitted by the separate communication unit. In this case, the transmission destination of the job transmission notification to the user terminal 12 is acquired in advance by a method such as inputting by the user in advance or receiving with the job.

Figure 5:
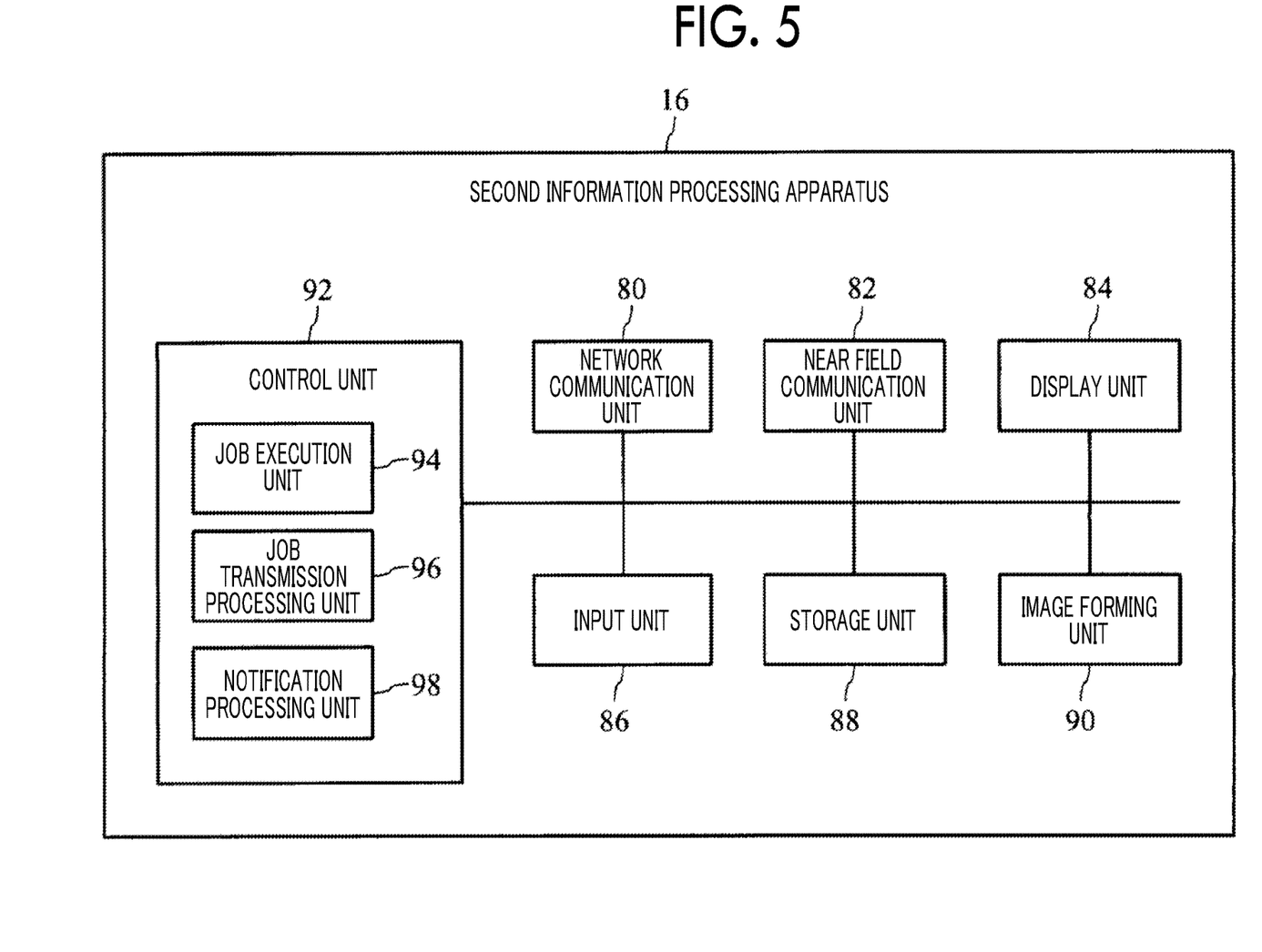
FIG. 5 is a configuration diagram illustrating a second information processing apparatus according to the exemplary embodiment.

FIG. 5 is a configuration diagram illustrating the second information processing apparatus 16. The hardware configuration of the second information processing apparatus 16 is the same as that of the first information processing apparatus 14, and thus the description thereof will be omitted. Further, in the following description, only differences between the second information processing apparatus 16 and the first information processing apparatus 14 will be described in terms of functions, and descriptions of functionally similar configuration requirements will not be described.

A network communication unit 80 communicates with the storage 18 via the second network 24. The network communication unit 80 receives a job from the storage 18 and transmits the job to the storage 18.

When the user terminal 12 approaches the second information processing apparatus 16, a job execution unit 94 executes the job that is previously transmitted by the user terminal 12 to the first information processing apparatus 14. Specifically, first, the job execution unit 94 determines whether a near field communication unit 82 has received the terminal ID 40 transmitted from the user terminal 12. When the user terminal 12 transmitting the terminal ID 40 approaches the second information processing apparatus 16 and the near field communication unit 82 receives the terminal ID 40, the job execution unit 94 confirms whether or not the job corresponding to the received terminal ID 40 is stored in the storage unit 88 of the second information processing apparatus 16. If the job has not already been transferred from the storage 18, the job is not stored in the storage unit 88, and thus the job execution unit 94 transmits the received terminal ID 40 and a request to transfer the job to the storage 18 from the network communication unit 80.

The storage 18 receives the terminal ID 40 and the transfer request from the second information processing apparatus 16 and, in response to the transfer request, the job associated with the terminal ID 40 stored in the storage unit of the storage 18 is transferred to the second information processing apparatus 16. The storage 18 deletes the transmitted job and the terminal ID 40 associated with the job from the storage unit of the storage 18. The storage 18 may transmit the job transmission notification indicating that the job is transmitted to the second information processing apparatus 16 and the job and the terminal ID 40 associated with the job are deleted from the storage 18 to the user terminal 12. The job transmission notification from the storage 18 to the user terminal 12 is performed using a communication unit such as an internet connection or a mobile telephone communication network. In this case, the transmission destination of the job transmission notification to the user terminal 12 is received from the first information processing apparatus 14 together with the job and the terminal ID 40.

The job transmitted from the storage 18 and the terminal ID 40 received by the near field communication unit 82 are associated with each other and stored in a storage unit 88.

The subsequent processing of the job execution unit 94 is the same as the processing of the job execution unit 70 of the first information processing apparatus 14. That is, the job execution unit 94 transmits a notification that the job corresponding to the received terminal ID 40 is stored to the user terminal 12 from the near field communication unit 82. When the user instructs the transmission of the execution instruction in response to the notification, the near field communication unit 32 of the user terminal 12 transmits the execution instruction information indicating the execution instruction of the job instead of the terminal ID 40. When the near field communication unit 82 of the second information processing apparatus 16 receives the execution instruction information, the job execution unit 94 executes the job corresponding to the job ID included in the execution instruction information in the image forming unit 62. Then, after the execution of the job is completed, the job execution unit 94 deletes the executed job and the terminal ID 40 associated with the job from the storage unit 88. Of course, the user can also directly operate the second information processing apparatus 16 so as to input a job execution instruction.

It is considered that once the user terminal 12 approaches the second information processing apparatus 16 and the second information processing apparatus 16 receives the job from the storage 18, the user terminal 12 may be separated from the second information processing apparatus 16 again. In this case, the user may not execute the job already transmitted to the second information processing apparatus 16 by the second information processing apparatus 16. If the job is left in the second information processing apparatus 16, there is a possibility that information related to the job may be viewed by users other than the user who has transmitted the job.

When the user terminal 12 is separated from the second information processing apparatus 16 by a predetermined distance after the second information processing apparatus 16 receives the job from the storage 18, a job transmission processing unit 96 returns the job and the terminal ID 40 associated with the job to the storage 18. Then, the job transmission processing unit 96 deletes the transmitted job and the terminal ID 40 from the storage unit 88.

The distance between the second information processing apparatus 16 and the user terminal 12 can be acquired, for example, as follows. The current position acquisition unit is provided in the user terminal 12, and the user terminal 12 periodically transmits the current position information indicating the current position of the user terminal 12 to the second information processing apparatus 16 from the near field communication unit 32. The job transmission processing unit 96 can obtain the current position information based on the received current position information and the known current position of the own apparatus.

A notification processing unit 98 transmits execution completion notification indicating that the job execution unit 94 has completed the execution of the job and that the job and the terminal ID 40 associated with the job have been deleted from the storage unit 88 to the user terminal 12 from the near field communication unit 82.

In addition, the notification processing unit 98 transmits to the user terminal 12 a job return notification indicating that when the job is returned to the storage 18 by the job transmission processing unit 96, the job is returned to the storage 18, and the job and the terminal ID 40 associated with the job are deleted from the storage unit 88. The job return notification from the second information processing apparatus 16 to the user terminal 12 is performed using a communication unit such as an internet connection or a mobile telephone communication network. In this case, the transmission destination of the job return notification to the user terminal 12 is received from the storage 18 together with the job and the terminal ID 40.

When the job return notification is received, the terminal ID 40 is transmitted again from the near field communication unit 32 of the user terminal 12 instead of the execution instruction information. Thereafter, the user terminal 12 approaches the first information processing apparatus 14 or the second information processing apparatus 16, the job and the terminal ID 40 are transferred to the first information processing apparatus 14 or the second information processing apparatus 16 to which the user terminal 12 approaches from the storage 18, and thereby the job can be executed by the information processing apparatus.

The configuration outline of the information processing system 10 according to the exemplary embodiment is as described above. Hereinafter, the flow of processing of the information processing system 10 will be described according to the flowcharts illustrated in FIG. 6 and FIG. 7.

Figure 6:
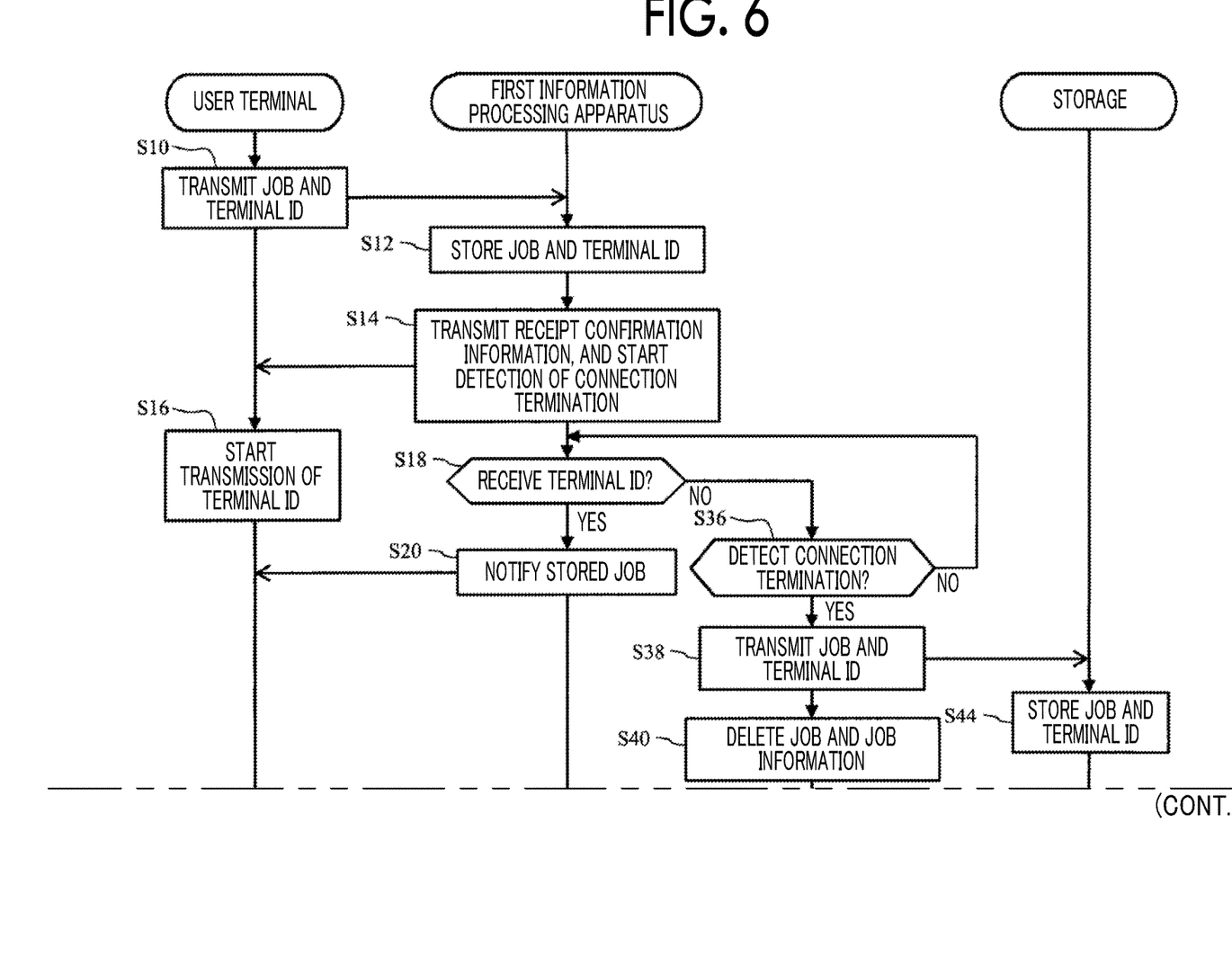
FIG. 6 is a first flowchart illustrating a flow of processing of the information processing system according to the exemplary embodiment.

In step S10, the job generating unit 44 generates a job, and transmits the generated job and the terminal ID 40 of the own apparatus in association with each other to the first information processing apparatus 14.

In step S12, the control unit 64 stores the job and the terminal ID received in step S10 in association with each other in the job storing unit 60.

In step S14, the control unit 64 transmits the receipt confirmation information to the user terminal 12. In addition, the connection termination detection unit 66 starts detection of connection termination from the first network 20 of the user terminal 12 indicated by the terminal ID 40 received in step S10.

In step S16, when receiving the receipt confirmation information from the first information processing apparatus 14, the transmission control unit 46 starts transmission of the terminal ID 40 from the near field communication unit 32.

In step S18, the job execution unit 70 determines whether the near field communication unit 52 has received the terminal ID 40 transmitted from the user terminal 12. When it has been received, the process proceeds to step S20. Hereinafter, steps S20 to S34 below are processing for executing the job in the first information processing apparatus 14.

In step S20, the job execution unit 70 transmits a notification that the job corresponding to the terminal ID 40 received in step S18 is stored to the user terminal 12 from the near field communication unit 52.

In step S22, based on the notification received in step S20, the control unit 42 causes the display unit 34 to display a screen for the user to confirm whether or not to transmit a job execution instruction to the first information processing apparatus 14. Then, the transmission control unit 46 determines whether or not the user has instructed transmission of the execution instruction on the screen, and if instructed, the process proceeds to step S24. The user terminal 12 maintains the transmission of the terminal ID 40 from the near field communication unit 32 until the user inputs a job execution instruction.

In step S24, the transmission control unit 46 causes the near field communication unit 32 to transmit execution instruction information indicating the job execution instruction instead of the terminal ID 40.

In step S26, the job execution unit 70 stands by until the execution instruction information of the job transmitted from the user terminal 12 is received by the near field communication unit 52, and when it is received, the process proceeds to step S28.

In step S28, the job execution unit 70 executes the job.

In step S30, the job execution unit 70 deletes the executed job and the job information of the job from the job storing unit 60.

In step S32, the notification processing unit 72 transmits execution completion notification indicating that the job execution unit 70 has completed the execution of the job, and the job and job information relating to the job have been deleted from the job storing unit 60 to the user terminal 12 from the near field communication unit 52.

In step S34, the transmission control unit 46 stops the transmission of the execution instruction information from the near field communication unit 32 using the execution completion notification received in step S32 as a trigger.

In step S18, when it is determined that the terminal ID 40 is not received by the near field communication unit 52, the process proceeds to step S36. Steps S36 to S44 below are processing for transmitting the job to the storage 18 from the first information processing apparatus 14.

In step S36, the connection termination detection unit 66 determines whether or not the connection of the user terminal 12 that has transmitted the job in step S10 to the first network 20 is terminated. When the connection termination is not detected, the process returns to step S18, and when the connection termination is detected, the process proceeds to step S38.

In step S38, the job transmission processing unit 68 transmits to the storage 18 the terminal ID 40 of the user terminal 12 in which the connection termination is detected in step S36, and the job associated with the terminal ID 40, which is stored in the job storing unit 60 in step S12.

In step S40, the job transmission processing unit 68 deletes the job transmitted in step S38 and the job information relating to the job from the job storing unit 60.

In step S42, the notification processing unit 72 transmits the job transmission notification indicating that the job is transmitted to the storage 18 and the job and the job information relating to the job have been deleted from the job storing unit 60 to the user terminal 12.

In step S44, the storage 18 having received the job and the terminal ID 40 from the first information processing apparatus 14 stores the job and the terminal ID 40 in association with each other in the storage unit of the storage 18.

Figure 7:
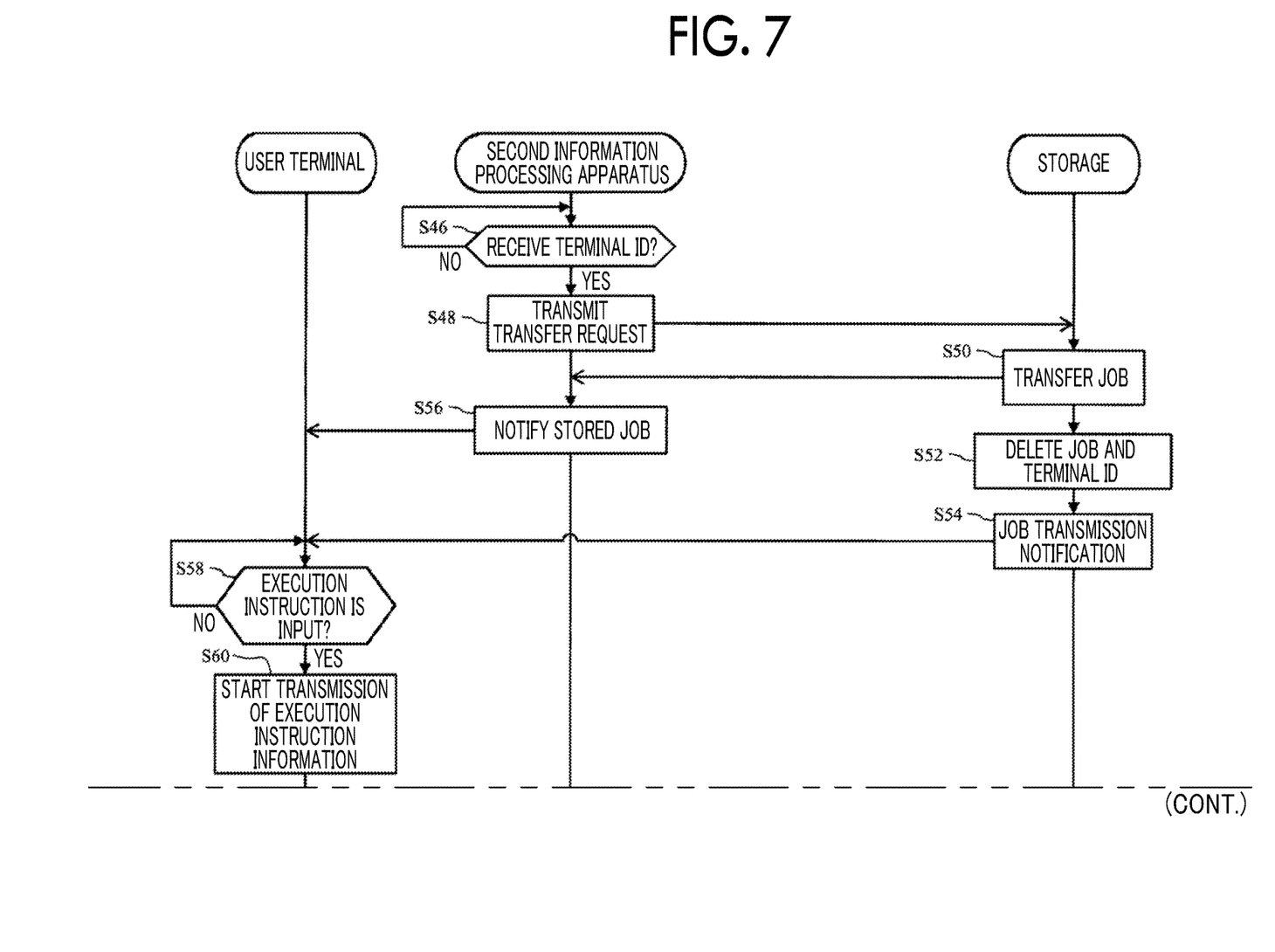
FIG. 7 is a second flowchart illustrating a flow of processing of the information processing system according to the exemplary embodiment.

While the job is transmitted to the storage 18 from the first information processing apparatus 14, the storage 18 stores the job and the terminal ID 40 in association with each other, and the terminal ID 40 is transmitted from the user terminal 12, the process proceeds to the flowchart in FIG. 7. Hereinafter, steps S46 to S60 are processing for transferring the job to the second information processing apparatus 16 from the storage 18.

In step S46, the job execution unit 94 stands by until the terminal ID 40 transmitted from the user terminal 12 is received by the near field communication unit 52, and when it is received, the process proceeds to step S48.

In step S48, the job execution unit 94 transmits a request to transfer the job from the network communication unit 80 to the storage 18 together with the terminal ID 40 received in step S46.

In step S50, the storage 18 transfers the job stored in association with the terminal ID 40 received in step S48 to the second information processing apparatus 16.

In step S52, the storage 18 deletes the job transmitted in step S50 and the terminal ID 40 associated with the job from the storage 18.

In step S54, the storage 18 transmits the job transmission notification indicating that the job is transmitted to the second information processing apparatus 16 and the job and the terminal ID 40 associated with the job are deleted from the storage 18 to the user terminal 12.

In step S56, the job execution unit 94 transmits a notification that the job corresponding to the terminal ID 40 received in step S46 is stored to the user terminal 12 from the near field communication unit 82.

In step S58, based on the notification received in step S56, the control unit 42 causes the display unit 34 to display a screen for the user to confirm whether or not to transmit a job execution instruction to the second information processing apparatus 16. Then, the transmission control unit 46 determines whether or not the user has instructed transmission of the execution instruction on the screen, and if instructed, the process proceeds to step S60. The user terminal 12 maintains the transmission of the terminal ID 40 from the near field communication unit 32 until the user inputs a job execution instruction.

In step S60, the transmission control unit 46 causes the near field communication unit 32 to transmit execution instruction information indicating the job execution instruction instead of the terminal ID 40.

In step S62, the job execution unit 94 determines whether or not the execution instruction information of the job transmitted from the user terminal 12 is received by the near field communication unit 82, and when it is received, the process proceeds to step S64. Steps S64 to S72 below are processing for executing the job in the second information processing apparatus 16.

In step S64, the job execution unit 94 executes the job.

In step S66, the job execution unit 94 deletes the executed job and the terminal ID 40 associated with the job from the storage unit 88.

In step S68, the notification processing unit 98 transmits execution completion notification indicating that the job execution unit 94 has completed the execution of the job, and the job and the terminal ID 40 relating to the job are deleted from the storage unit 88 to the user terminal 12 from the near field communication unit 82.

In step S70, the transmission control unit 46 determines whether or not the execution completion notification is received from the second information processing apparatus 16. In a case where the job is executed in the second information processing apparatus 16 in step S64, the execution completion notification is received, and thus the process proceeds to step S72.

In step S72, the transmission control unit 46 stops the transmission of the execution instruction information from the near field communication unit 32.

In the processing of the following steps S76 to S84, when the job is returned to the storage 18 from the second information processing apparatus 16, the user terminal 12 does not receive the execution completion notification from the second information processing apparatus 16, and thus the process proceeds to step S72.

In step S72, the transmission control unit 46 causes the near field communication unit 32 to transmit the terminal ID 40 instead of the execution instruction information, and the process returns to step S46.

In step S62, when it is determined that the execution instruction information is not received by the near field communication unit 82, the process proceeds to step S76.

Steps S76 to S84 below are processing for returning the job to the storage 18 from the second information processing apparatus 16.

In step S76, the job transmission processing unit 96 determines whether or not the user terminal 12 is separated from the second information processing apparatus 16 by a predetermined distance. When the user terminal 12 is within a predetermined distance from the second information processing apparatus 16, the process returns to step S62, and when the user terminal 12 is separated from the second information processing apparatus 16 by a predetermined distance, the process proceeds to step S78.

In step S78, the job transmission processing unit 96 returns the job received from the storage 18 in step S50 and the terminal ID 40 associated with the job to the storage 18.

In step S80, the job transmission processing unit 96 deletes the job returned in step S78 and the terminal ID 40 associated with the job from the storage unit 88.

In step S82, the notification processing unit 98 transmits the job return notification indicating that the job is returned to the storage 18, and the job and the terminal ID 40 associated with the job are deleted from the storage unit 88 to the user terminal 12, and the process returns to step S46.

In step S84, the storage 18 determines whether or not the job is returned from the second information processing apparatus 16, and when the job is not returned, the processing is finished; on the other hand, when the job is returned, the process returns to step S44 (refer to FIG. 6), and the storage 18 stores again the returned job and the terminal ID 40 in association with each other in the storage unit of the storage 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system, comprising:
a first information processing apparatus connected to a first network;
a second information processing apparatus connected to a second network different from the first network; and
a storage apparatus communicable with the first information processing apparatus and the second information processing apparatus, wherein
the first information processing apparatus receives, from a user terminal, a processing request associated with the user terminal via the first network, and then transmits the processing request to the storage apparatus when connection of the user terminal to the first network is terminated,
the second information processing apparatus transmits a request to transfer the processing request associated with the user terminal to the storage apparatus when the user terminal approaches the second information processing apparatus, and
the storage apparatus transfers the processing request received from the first information processing apparatus to the second information processing apparatus in response to the transfer request.

2. The information processing system according to claim 1, wherein
the second information processing apparatus receives the processing request from the storage apparatus, and then returns the processing request to the storage apparatus when the user terminal is separated from the second information processing apparatus by a predetermined distance.

3. The information processing system according to claim 1, wherein
the user terminal transmits the processing request and a terminal identifier that identifies the user terminal to the first information processing apparatus, and
the first information processing apparatus stores the processing request and the terminal identifier corresponding to the user terminal that has transmitted the processing request in association with each other, and transmits, to the storage apparatus, the processing request associated with the terminal identifier of the user terminal whose connection to the first network is terminated.

4. The information processing system according to claim 3, wherein
the user terminal further transmits information indicating transferability for each processing request to the first information processing apparatus, and
the first information processing apparatus transmits, to the storage apparatus, a processing request that is permitted to be transferred among the processing requests associated with the terminal identifier of the user terminal whose connection to the first network is terminated.

5. The information processing system according to claim 1, wherein
when the first information processing apparatus is not able to communicate with the user terminal via the first network for a predetermined time, the connection of the user terminal to the first network is determined to be terminated.

6. The information processing system according to claim 1, wherein
the first information processing apparatus transmits the processing request to the storage apparatus when at least one of the following conditions is satisfied: (i) the connection of the user terminal to the first network is terminated and a distance between the first information processing apparatus and the user terminal is a predetermined distance or more and (ii) a current time is during business hours of a user using the user terminal.

7. The information processing system according to claim 1, wherein
at least one of the first information processing apparatus, the second information processing apparatus, and the storage apparatus deletes the processing request transmitted to another apparatus from a storage unit of the one apparatus.

8. The information processing system according to claim 7, wherein
at least the one of the first information processing apparatus, the second information processing apparatus, and the storage apparatus performs notification to the user terminal when the processing request is transmitted to the another apparatus.

9. The information processing system according to claim 1, wherein
the processing request is associated with a terminal identifier of the user terminal, and
the second information processing apparatus transmits the transfer request when the terminal identifier transmitted from the user terminal approaching the second information processing apparatus is received by the second information processing apparatus.

10. A first information processing apparatus connected to a first network, comprising:
a processing unit configured to, when connection of a user terminal to the first network is terminated after receiving a processing request from the user terminal via the first network, transmit the processing request to a storage apparatus communicable with a second information processing apparatus connected to a second network different from the first network, wherein
the second information processing apparatus transmits a request to transfer the processing request associated with the user terminal to the storage apparatus when the user terminal approaches the second information processing apparatus, and
the storage apparatus transfers the processing request received from the first information processing apparatus to the second information processing apparatus in response to the transfer request.

11. A non-transitory computer readable medium storing a program causing a computer to execute an information processing process, the process comprising:
causing a first information processing apparatus connected to a first network to receive a processing request from a user terminal via the first network; and
then causing the first information processing apparatus to transmit the processing request to a storage apparatus communicable with a second information processing apparatus connected to a second network different from the first network when connection of the user terminal to the first network is terminated, wherein
the second information processing apparatus transmits a request to transfer the processing request associated with the user terminal to the storage apparatus when the user terminal approaches the second information processing apparatus, and
the storage apparatus transfers the processing request received from the first information processing apparatus to the second information processing apparatus in response to the transfer request.

* * * * *